United States Patent [19]

Bucher et al.

[11] Patent Number: 4,740,840

[45] Date of Patent: Apr. 26, 1988

[54] PYROELECTRIC CAMERA SIGNAL PROCESSING HAVING INTERRELATED MULTI-PARAMETER PEDESTAL SIGNAL LEVEL COMPENSATION

[75] Inventors: Hans R. Bucher, Boulder; Donald E. Hodd, Niwot, both of Colo.

[73] Assignee: Xedar Corporation, Boulder, Colo.

[21] Appl. No.: 96,167

[22] Filed: Sep. 11, 1987

Related U.S. Application Data

[63] Continuation-in-part of Ser. No. 813,011, Dec. 24, 1985, Pat. No. 4,694,334.

[51] Int. Cl.[4] .............................................. H04N 5/33
[52] U.S. Cl. .................................. 358/113; 250/333; 358/163
[58] Field of Search ................ 358/113, 163; 250/333, 250/334

[56] References Cited

U.S. PATENT DOCUMENTS 4,481,535 11/1984 Hodd .................................. 358/113
4,686,566 8/1987 Bucher .............................. 358/113
4,694,334 9/1987 Bucher .............................. 358/113

Primary Examiner—Howard W. Britton
Attorney, Agent, or Firm—Robert E. Harris

[57] ABSTRACT

A system and method are disclosed for pyroelectric camera signal processing, which processing includes multi-parameter automatic signal level adjustment to compensate for the effects of pedestal level variations. The pyroelectric vidicon tube generates an electrical output signal component indicative of target signal information based upon the sensed thermal energy emitted from the target, and also generates a pedestal component around which the target signal information is centered, and this information is processed to provide field video signals which are utilized to provide a composite video output. An automatic adjustment control unit, responsive to the field video signal, provides automatic adjustment of gain, balance, and offset to thereby allow the pyroelectric camera to operate at an optimized signal-to-noise ratio.

20 Claims, 4 Drawing Sheets

Fig_3

PYROELECTRIC CAMERA SIGNAL PROCESSING HAVING INTERRELATED MULTI-PARAMETER PEDESTAL SIGNAL LEVEL COMPENSATION

RELATED APPLICATION

This application is a continuation-in-part of our pending U.S. patent application Ser. No. 813,011, filed Dec. 24, 1985 and entitled "Pyroelectric Camera Signal Processing Having Pedestal Signal Level Compensation", now U.S. Pat. No. 4,694,334.

FIELD OF THE INVENTION

This invention relates to pyroelectric camera signal processing and, more particularly, relates to pyroelectric camera signal processing having pedestal signal level compensation.

BACKGROUND OF THE INVENTION

As is well known, a pyroelectric camera is basically a television camera that is capable of producing an infrared television picture. A pyroelectric vidicon tube is utilized as the input of the pyroelectric camera to sense a thermal image of the target by receiving thermal energy emitted by the target and provides an electrical output signal indicative thereof, which electrical signal output is then processed by associated electronic circuitry to provide a composite video output signal.

In order to reduce the readout lag and to be able to read out the positive and negative information from the target of a pyroelectric vidicon tube, it is required that the tube be operated in a mode so as to establish a pedestal component around which the signal information from the vidicon tube is centered. The pedestal component is normally generated either by secondary emission (by means of pulsing the thermionic cathode and beam control grid negative during flyback) or is generated by means of ionizing hydrogen ($H_2$) gas (during flyback of the reading beam). While either method may be employed in pyroelectric camera systems, both approaches have been found to suffer from stability problems encountered in the amplitude of the generated pedestal level and the effects it has on the output signal and image quality obtained.

A change in pedestal amplitude can cause severe flicker, which flicker occurs at the field rate of the system if analog signal processing is employed, and pedestal level changes can also lead to signal processing amplifier saturation which renders the system useless.

The pedestal level in a pyroelectric camera is influenced by several factors including the cathode pulse amplitude, the beam control grid ($G_1$) pulse amplitude, and the thermionic cathode. The cathode pulse and the $G_1$ pulse amplitudes are circuit parameters, and the thermionic cathode characteristic is controlled in manufacture of the camera tube and changes over the life of the camera tube.

If ionization is employed, the gas pressure will greatly influence the pedestal level, and, again, the characteristic of the gas reservoir and the thermionic cathode will change with tube life.

Different control systems and methods have been proposed to stabilize the pedestal level of camera tubes either by monitoring the grid current in the tube and by using its magnitude to control the pedestal level, or by monitoring the grid current and using its magnitude to adjust the hydrogen pressure which then controls the pedestal level.

It has been found, however, that at least some known control systems and methods are difficult to implement and/or have been found to be only partially effective. It has also heretofore been found that while the effect of pedestal level fluctuations might be corrected within limited levels, such correction, if achieved, normally adversely affects available dynamic range.

In addition, at least some known control systems and methods do not provide adequate compensation for the undesirable pedestal level shift generated by the temperature difference between the shutter temperature and the average scene temperature, which temperature difference manifests itself as a DC-pedestal shift and this can also cause flicker, limited dynamic range, and/or possibly amplifier saturation and loss of the image.

With respect to prior art patents, our U.S. Pat. No. 4,481,535 is directed to a signal processing system for a pyroelectric camera that includes separate DC-restorer and automatic gain control (AGC) circuits.

SUMMARY OF THE INVENTION

This invention provides a system and method for pyroelectric camera signal processing which includes compensating for the effects of pedestal component level variations (due to drift, tube aging, and/or effects of temperature differences between the shutter and scene average temperature) by providing automatic adjustment of interrelated multi-parameters (gain, balance and offset as described herein) to thereby allow the pyroelectric camera to operate at, or at least near, optimized signal-to-noise ratios to thus enhance the performance of the camera.

It is therefore an object of this invention to provide an improved system and method for pyroelectric camera signal processing having interrelated multi-parameter pedestal signal level compensation.

It is another object of this invention to provide an improved system and method for processing pyroelectric camera signals by providing automatic adjustment of gain, balance and offset to thereby provide pedestal signal level compensation.

It is still another object of this invention to provide an improved system and method for processing pyroelectric camera signals that results in improved signal-to-noise ratios for enhancing camera performance.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical applications of the principles thereof, and in which.

DESCRIPTION OF THE INVENTION

Figure 1:
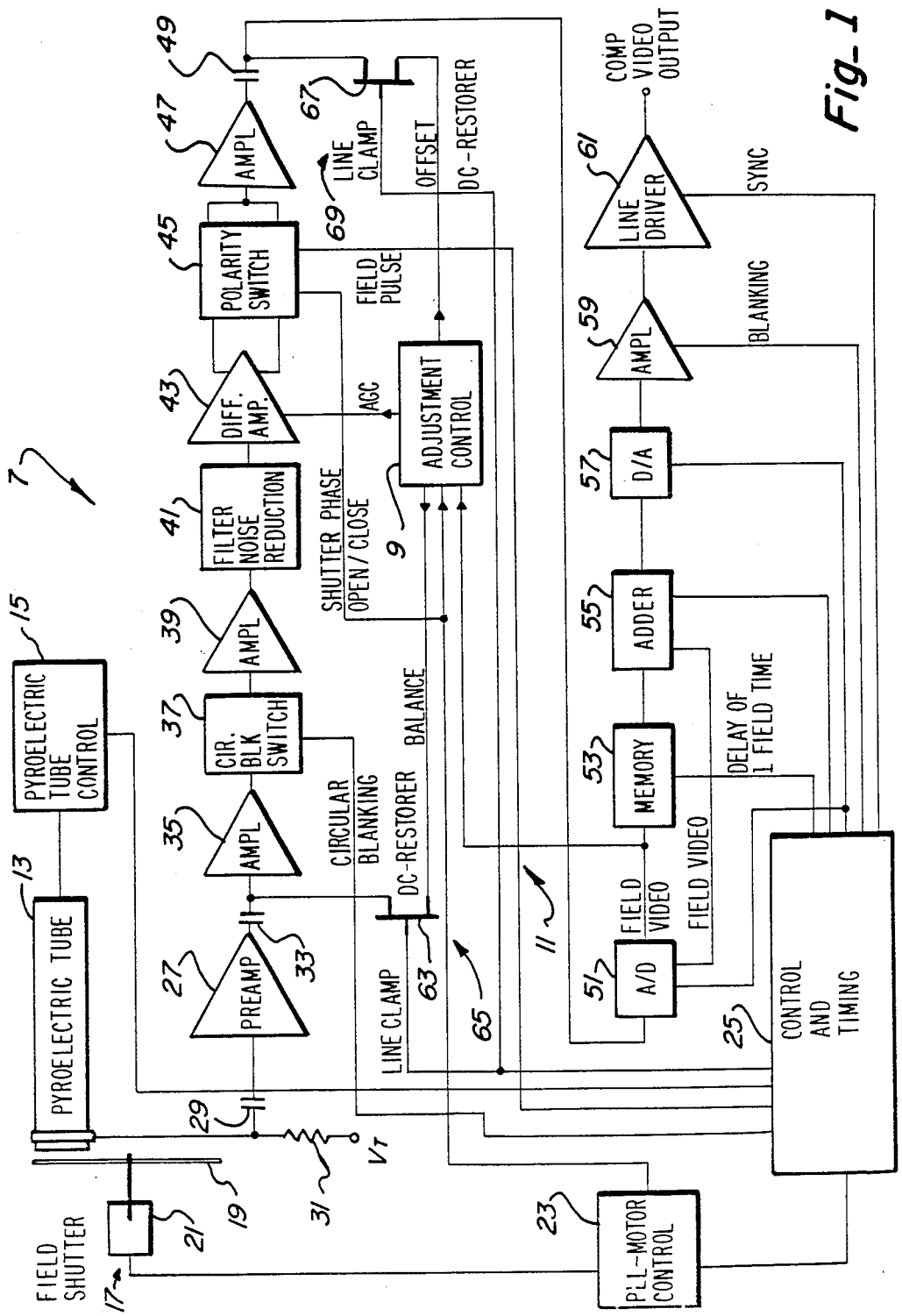
FIG. 1 is a block diagram illustrating the unit of this invention incorporated into and made a part of a pyroelectric camera signal processing system.

Pyroelectric camera signal processing system 7 is shown in the block diagram of FIG. 1 to include adjustment control unit 9 as a part of compensation circuitry 11. While the pyroelectric camera particularly shown in FIG. 1 is a chopper-type video camera, the signal processing system, utilizing compensating circuitry, as shown and described herein, is not meant to be restricted to the particular type pyroelectric camera illustrated, although being particularly well suited therefor. In addition, since pyroelectric cameras are known, the details of such cameras have been included herein only to the extent deemed necessary to illustrate the invention.

A signal processing system for a chopper-type pyroelectric camera is shown and described in our U.S. Pat. No. 4,481,535, issued Mar. 6, 1984, and assigned to the Assignee of this invention. This invention is based upon and further supports the system shown in U.S. Pat. No. 4,481,535, and this patent is therefore hereby included by reference herein.

In addition, our pending U.S. patent application Ser. No. 813,011, filed Dec. 24, 1985, to be issued Sept. 15, 1987 as U.S. Pat. No. 4,694,334, is directed to pyroelectric camera signal processing having pedestal signal level compensation utilizing separate feedback for DC restoration and gain control. This application is a continuation-in-part of the system and method as shown and described in U.S. patent application Ser. No. 813,011 which is therefore likewise included by reference herein.

As shown in FIG. 1, signal processing system 7 includes a pyroelectric vidicon tube 13 which receives thermal energy emitted from a target (not shown). As indicated, pyroelectric vidicon tube 13 is conventionally controlled by pyroelectric tube control unit 15.

In order for pyroelectric vidicon tube 13 to sense steady-state thermal information, a chopper assembly 17 is provided, which assembly allows tube 13 to receive thermal information and generate an electrical output signal indicative thereof even though the information is not dynamic in nature.

As indicated, chopper assembly 17 may conventionally include a chopper wheel 19 that is rotated by motor 21 controlled by phase lock loop (PLL) motor control unit 23. PLL motor control unit 23 is, in turn, controlled by control and timing circuitry 25 conventionally found in the pyroelectric camera (circuitry 25 also controls pyroelectric tube control unit 15) so that the shutter edge is maintained in alignment with the tube reading beam on a field-to-field basis. In other words, the shutter is caused to rotate to alternately provide first and second fields, with the rotation being at a speed such that during each first field the camera is imaging the target and during each second field the shutter (which is opaque to infrared) blocks passage of the infrared to the pyroelectric vidicon tube.

As also shown in FIG. 1, the output signal from pyroelectric vidicon tube 13 is coupled to preamplifier 27 through capacitor 29 one side of which has a resistor 31 connected with the $V_T$ power supply. The output signal from preamplifier 27 (indicated as pre-amp out in FIGS. 3 and 4) is coupled through capacitor 33 to amplifier 35, and the output of amplifier 35 is coupled through circular blanking switch 37 to amplifier 39 (illustrated as pre-bal video in FIGS. 3 and 4).

After amplification by amplifier 39, the signal is coupled through noise reduction filter 41 to differential output amplifier 43. Differential amplifier 43 is connected with polarity switch 45 which is controlled by the field pulse (from control and timing unit 25) and the shutter position pulse (shutter open or closed) (from PLL-motor control unit 23) to select the video signal on a field-to-field basis such that a unity polarity signal is obtained.

In order to add the two fields, one field must be delayed for one field time after which the two fields are added. As shown in FIG. 1, this is accomplished digitally by coupling the output signal from amplifier 47 through capacitor 49 (illustrated as A-D input in FIGS. 3 and 4) to analog-to-digital (A/D) converter 51 one output of which is coupled to digital memory unit 53 for delaying the field video by one field time after which the output from memory unit 53 is coupled to adder 55. At this time, the field (present field) from analog-to-digital (A/D) converter 51 is added to the delayed signal.

The output signal from adder 55 is coupled through digital-to-analog (D/A) converter 57 to again provide an analog signal output. By so doing, each succeeding field signal is added to the immediately preceding field signal. As indicated in FIG. 1, the analog-to-digital converter 51, memory 53, adder 55, and digital-to-analog converter 57 are controlled by outputs from control and timing unit 25.

The analog output signal from digital-to-analog signal converter 57 is then further amplified by amplifier 59 and then conditioned into a composite video signal by adding blanking and sync from control and timing unit 25 at amplifier 59 and line driver 61, respectively.

During the line flyback of the deflection, a pedestal current on the target must be generated by secondary emission in the target in order for the pyroelectric vidicon to function properly. This is conventionally accomplished by pulsing the cathode potential sufficiently negative during flyback in response to the target potential while, at the same time, pulsing the beam control grid ($G_1$) of the pyroelectric vidicon tube to control the amount of secondary electron current. In order to stabilize the operation of the pyroelectric vidicon tube, it is also necessary to overscan the tube target, which creates a circular image.

The nominal pedestal level can shift so as to be increasing or decreasing due to slight amplitude changes in the cathode pulse or $G_1$, due to changes in the thermionic cathode, due to tube aging, and/or due to the temperature difference between the shutter and the scene ambient.

Circular blanking switch 37, in conjunction with the DC-pedestal of line clamp restorer unit 65, eliminates the pedestal generating signal during flyback. By adjusting the DC-level of restorer unit 65 to the correct potential, the optimum condition can be obtained. Hence, by controlling the DC-level of the line-by-line restorer unit 65, compensation can be automatically made for changes in pedestal level due to drift, tube aging, and/or generated by shutter temperature to scene temperature differences.

As also indicated in FIG. 1, the digital video (field video) output of A/D converter 51 is coupled to adjustment control unit 9 of compensation circuitry 11 provided according to this invention. As shown, adjustment control unit 9 also receives the shutter phase (open-close) output from PLL-motor control unit 23, and provides a gain control output to differential amplifier 43, a balance output to field effect transistor (FET) 63 of DC restorer circuit 65, and an offset output to field effect transistor (FET) 67 of DC restorer circuit 69. As shown, FETs 63 and 67 also receive a line clamp input from control and timing unit 25.

Figure 2:
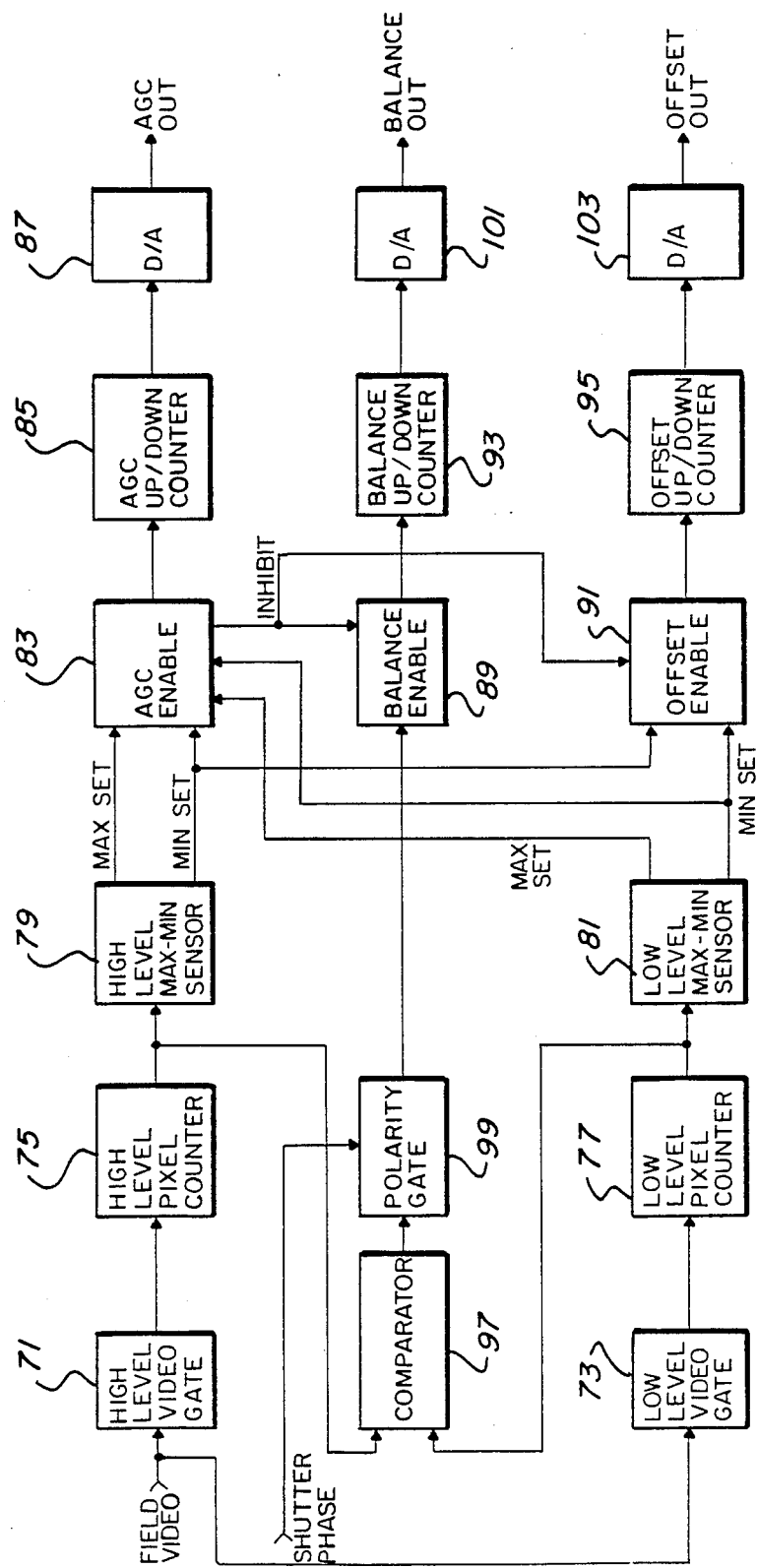
FIG. 2 is an expanded block diagram of the adjustment control unit shown in block form in FIG. 1.

Adjustment control unit 9 is shown in greater detail by the block diagram of FIG. 2. As shown, the field video output from A/D converter 51 is coupled to gate arrays 71 and 73 (indicated in FIG. 2 as high level video gate 71 and low level video gate 73). Gate 71 passes digital signals indicative of pixels of picture information above the binary count of 111,0000, and gate 73 passes digital signals indicative of pixels of picture information below the binary count of 000,1111. Thus, gates 71 and 73 sort the video into two utilized groups—low level pixels below the binary count of 000,1111, and high level pixels over the binary count of 111,0000 (a third middle group could also be obtained between the binary counts of 0000,111 and 111,0000, but this group is not used herein).

Figure 3:
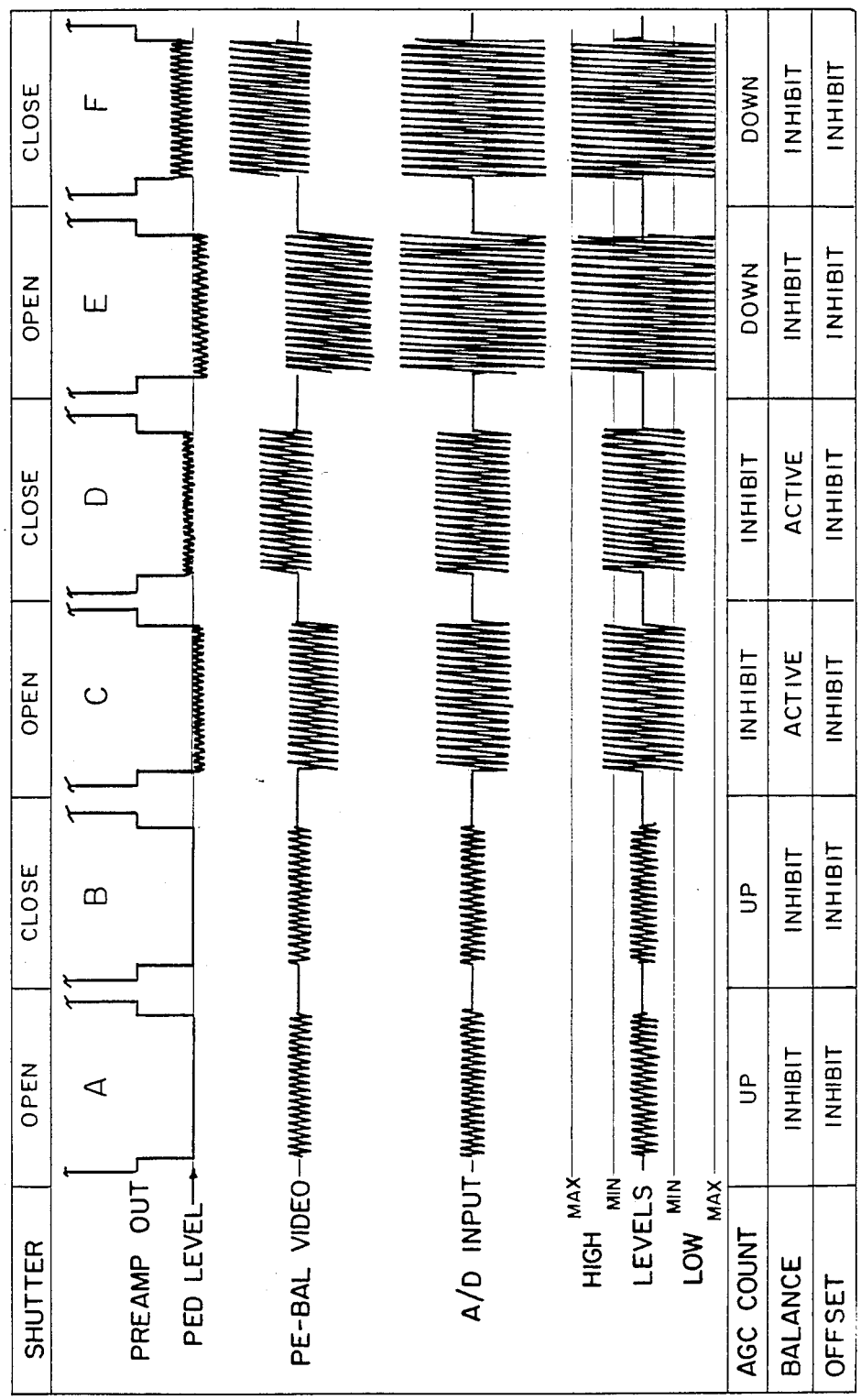
FIG. 3 is a series of typical timing and signal diagrams illustrating normal video and balance functions.
Figure 4:
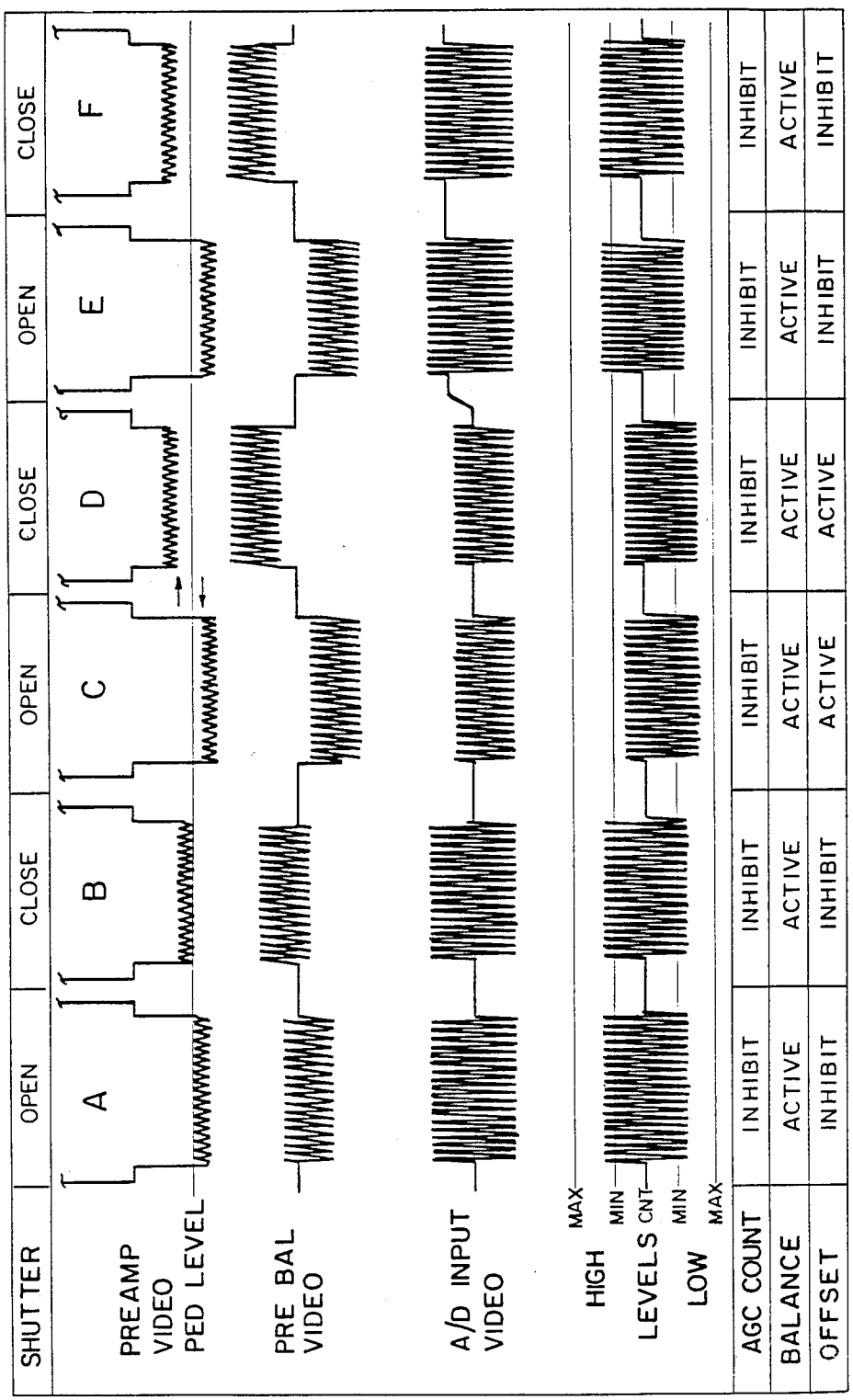
FIG. 4 is a series of typical timing and signal diagrams illustrating normal video and offset functions.

The output from high level video gate 71 is coupled to high level pixel counter 75, while the output from low level video gate 73 is coupled to low level pixel counter 77. Counters 75 and 77 accumulate the number of pixels in a field of video for the high and the low groups, and this forms a log, or history of the field. These "histograms", as they might be termed, are the basis for the three interrelated multi-parameter adjustments carried out by adjustment control unit 9 (as illustrated in FIGS. 3 and 4).

The three adjustments carried out by adjustment control unit 9 affect three different and separate parameters, or functions—automatic gain control (AGC), balance (DC restoration), and offset (variation of voltage applied to FET 67 in lieu of fixed voltage $V_T$ as heretofore utilized). Automatic control of these three DC voltage parameters, or functions, according to this invention, allows the system to be fully self-optimizing and allows the A/D converter to operate using the full dynamic range at all times, and this allows the camera to operate at, or near, the optimized signal-to-noise ratio at all times.

The first priority and controlling function is AGC control which operates based upon two windows established by high level maximum-minimum (max-min) sensor unit 79 (high level max-min sensor unit 79 is connected to receive the output from high level pixel counter 75 and provides outputs indicative of High Max Set and High Min Set), and two additional windows established by low level maximum-minimum (max-min) sensor unit 81 (low level max-min sensor unit 81 is connected to receive the output from low level pixel counter 77 and provides outputs indicative of Low Max Set and Low Min Set).

Signals indicative of High Max Set, High Min Set, Low Max Set and Low Min Set are coupled to AGC enable unit 83. If both the High Min and Low Min windows are not set (i.e., no video pixels are sensed above or below the preselected binary values above set forth), AGC up/down counter 85 will be caused to count up (as indicated in FIGS. 3 A and B) to thereby provide an output (AGC out) through D/A converter 87 to thereby cause an increase in the gain of the video amplifier. If, however, one or both min windows are set but neither one of the max windows is set (i.e., no video pixels are sensed at or above 111,1111 and at or below 000,0000), AGC counter 85 will be inhibited and will not count (as indicated in FIGS. 3 C and D). With one or both of the max windows set, AGC up/down counter 85 will be caused to count down (as indicated in FIGS. 3E and F) which causes a decrease in the gain of the video amplifier.

AGC control circuit 83 also provides an Inhibit output to balance enable unit 89 and offset enable unit 91 to inhibit operation of balance up/down counter 93 and offset up/down counter 95 when AGC counter 85 is counting down. This allows the AGC circuitry to gain (or regain) control of the video signal before either balance or offset is allowed to be changed.

Operation of balance enable unit 89 is based upon the content of the two "histograms" accumulated in high level pixel counter 75 and low level pixel counter 77, the outputs from which are coupled to comparator 97 for comparison thereat. The output from comparator 97 is coupled to polarity gate 99 (which also receives the shutter phase input) and the output from polarity gate 99 causes balance enable unit 89 to direct balance up/down counter 93 to count up or down to return the video signal to balance by providing an output (as balance out) through D/A converter 101. The balance function is constantly adjusted to optimize the signal, and must also take into account the polarity of the video signal which was fed into the "histograms". If there was no information in the "histograms" or the AGC circuitry is counting down, balance counter 93 is inhibited.

Operation of the Offset function is based on the Low-Min and High-Min windows. If both are clear or both are set, offset enable unit 91 will not allow offset counter 95 to count in either direction (i.e., the offset counter is inhibited as indicated in FIGS. 4 A, B, E and F). When only one min window is set, however, the offset counter 95 is directed to count in that direction (as indicated in FIGS. 4 C and D) by providing an output (as offset out) through D/A converter 103 to DC restorer circuit 69 (in lieu of a fixed voltage $V_T$ heretofore supplied to FET 67). This function compensates for the shutter to background difference which provides an energy input that is a real signal, but contains no useful information and must be removed to maintain an optimized signal into the A/D converter. Again, the offset function, like that of the balance function, is continuously adjusted to keep camera operation at fully optimized performance.

As can be appreciated from the foregoing, interrelated multi-parameter pedestal signal level compensation is automatically carried out by utilization of this invention, and this enables the pyroelectric camera to operate at, or near, an optimized signal-to-noise ratio which enhances camera performance.

What is claimed is:

1. A signal processing system for a pyroelectric camera having a pyroelectric vidicon tube, said system comprising:
   input means for receiving output signals from said pyroelectric vidicon tube, which output signals include pedestal components;
   processing means including signal path establishing means having amplifying means connected with said input means to receive said output signals therefrom and analog-to-digital converter means connected with said amplifying means, said processing means also including DC restorer means and gain control means, both of which are connected with said amplifying means; and adjustment control means have an input connected with said analog-to-digital converter means to receive digital outputs therefrom, said adjustment control means including first output means, first enabling means for enabling first output signals to be provided from said first output means to said gain control means dependent upon said digital outputs received by said adjustment control means from said analog-to-digital converter means, second output means, and second enabling means for enabling second output signals to be provided from said second output means to said DC restorer means dependent upon said digital output signals received by said adjustment control means from said analog-to-digital converter means with said second output signal being precluded upon occurence of at least preselected ones of said first output signals whereby said automatic control means automatically adjusts operation of said DC restorer means and said gain control means to thereby enhance operation of said pyroelectric camera by compensating for variations in the level of said pedestal components.

2. The system of claim 1 wherein processing means includes second DC restorer means connected with said analog-to-digital converter means, and wherein said adjustment control means includes third output means and third enabling means for enabling third output signals to vary said second DC restorer means dependent upon said digital output signals received from said analog-to-digital converter means.

3. The system of claim 1 wherein adjustment control means includes sensing means for sensing preselected parameters of said digital outputs from said analog-to-digital converter means and upon occurrence of said preselected parameters allowing said first and second enabling means to enable said first and second outputs to provide said first and second outputs.

4. The system of claim 3 wherein said digital outputs from said analog-to-digital converter means are indicative of pixels of picture information, and wherein said adjustment control means also includes gate means for grouping said pixel indicative digital outputs into predetermined groups and providing outputs according to said predetermined groups, and counter means, responsive to said outputs from said gate means, providing outputs to said sensing means.

5. The system of claim 4 wherein said gate means includes first and second gate arrays connected with said analog-to-digital converter means to receive the digital output therefrom, and wherein said counter means includes first and second counters connected with different ones of said first and second gate arrays for separately accumulating digital outputs indicative of pixels of picture information with respect to each of said predetermined groups.

6. The system of claim 5 wherein said first counter counts digital outputs indicative of pixels in a predetermined high level group, and wherein said second counter counts digital outputs indicative of pixels in a preselected low level group.

7. The system of claim 6 wherein said sensing means includes first and second maximum and minimum sensors for determining high maximum and high minimum window set conditions and for determining low maximum and low minimum window set conditions, which set conditions control generation of said first output signals used to control said gain control means.

8. The system of claim 6 wherein said sensing means includes comparator means connected with said first and second counters, and a polarity gate connected with said comparator, with the output form said polarity gate controlling generation of said second output signals used to control said DC restorer means.

9. A signal processing system for a pyroelectric camera having a pyroelectric vidicon tube, said system comprising:

input means for receiving output signals from said pyroelectric vidicon tube, said output signals including pedestal components;

processing means including signal path establishing means having first amplifying means connected with said input means to receive said output signals therefrom, second amplifying means connected with said first amplifying means, and analog-to-digital converter means connected with said second amplifying means, said processing means also including first DC restorer means connected with said first amplifying means, second DC restorer means connected with said analog-to-digital converter means, and gain control means connected with said second amplifying means; and adjustment control means connected with said analog-to-digital converter means to receive digital output signals indicative of pixel information therefrom, said adjustment control means including grouping means for grouping said digital output signals indicative of pixel information into predetermined groups, sensing means connected with said grouping means for sensing preselected parameters of said predetermined groups, first output means connected with said gain control means, first enabling means connected with said sensing means for enabling first output signals from said first output means, second output means connected with said first DC restorer means, second enabling means connected with said sensing means for enabling second output signals from said second output means, third output means connected with said second DC restorer means, and third enabling means connected with said sensing means for enabling third output signals from said third output means to thereby automatically adjust said gain control means and said first and second DC restorer means to compensate for variations in the level of said pedestal components for enhancement of operation of said pyroelectric camera.

10. The system of claim 9 wherein said grouping means includes first and second gate means connected with said analog-to-digital converter means and first and second counter means connected with said first and second gate means, wherein said first and third enabling means includes first and second sensing means connected with said first and second counter means, and wherein said second enabling means includes comparator means connected with said first and second counter means, and polarity gate means connected with said comparator means.

11. The system of claim 9 wherein said adjustment control means includes up/down counter means connected with each of said first, second and third enabling means.

12. In a signal processing system for a pyroelectric camera having a pyroelectric vidicon tube, signal path establishing means having input means for receiving output signals from said pyroelectric vidicon tube indicative of pixels of picture information with said output signals including pedestal components subject to level variations, first amplifying means connected with said input means, second amplifying means connected with said first amplifying means, and analog-to-digital converter means connected with said second amplifying means and providing digital output signals indicative of said pixels of picture information, said signal processing system also having first DC restorer means connected with said first amplifying means, second DC restorer means connected with said second amplifying means, and gain control means connected with said second amplifying means, an adjustment control unit for compensating for said level variations of said pedestal components, said adjustment control unit comprising:

first and second gate means connected with said analog-to-digital converter means to receive said digital output signals therefrom, said first gate means passing digital output signals indicative of predetermined high pixel levels and said second gate means passing digital output signals indicative of predetermined low pixel levels;

first and second counter means connected with said first and second gate means, respectively, with said first counter means accumulating said digital output signals indicative of said predetermined high pixel levels and said second counter means accumulating said digital output signals indicative of said predetermined low pixel levels;

first and second sensing means connected with said first and second counter means, respectively, with said first sensing means, responsive to outputs from said first counter means, providing outputs indicative of a high level max set condition and a high level min set condition, and with said second sensing means, responsive to outputs from said second counter means, providing outputs indicative of a low level max set condition and a low level min set condition;

gain control enabling means connected with said first and second sensing means to receive said outputs therefrom indicative of said high level max set condition, said high level min set condition, said low level max set condition, and said low level min set condition and, responsive thereto, providing a gain control enabling output for enabling adjustment of said gain control means;

comparator means connected with said first and second counter means to receive the outputs therefrom for comparison of said outputs and providing a difference output;

polarity gate means connected with said comparator means to receive said difference outputs and providing an output indicative thereof;

balance enabling means connected with said polarity gate means to receive the output therefrom for enabling adjustment of said first DC restorer means; and offset enabling means connected with said first and second sensing means to receive said output signals indicative of said high level min set condition and said low level min set condition and, responsive thereto, providing an offset enabling output for enabling variation of DC voltage to said second DC restorer means.

13. The unit of claim 12 wherein said first gate means passes digital output signals indicative of pixels of picture information having a binary count above 111,0000, and wherein said second gate means passes digital output signals indicative of pixels of picture information having a binary count below 000,1111.

14. The unit of claim 12 wherein said gain control enabling means provides an inhibit output to said balance and offset enabling means whereby said balance and offset enabling signals are precluded when said gain enabling means enables providing of said gain enabling output.

15. The unit of claim 12 wherein said unit includes an automatic gain control up/down counter connected to receive said gain control enabling output from said gain control enabling means, a balance up/down counter connected to receive said balance output from said balance enabling means, and an offset up/down counter connected to receive said offset output from said offset enabling means.

16. A method for compensating for level variations of pedestal components originating from a pyroelectric vidicon tube of a pyroelectric camera, said method comprising:

generating output signals indicative of pixels of picture information from said pyroelectric vidicon tube;

processing said generated output signals to provide a composite video signal with said processing including amplifying of said output signals and converting said output signals to digital output signals;

grouping said digital output signals into separate groups based upon the pixel levels represented by said digital output signals;

determining preselected parameters of said groups of output signals;

utilizing said determined preselected parameters of said groups to enable generation of gain and DC restoration signals; and applying said gain and DC restoration signals to said amplifying means to adjust the gain and DC restoring levels to compensate for sensed variations of level variations of said pedestal components to thereby enhance operation of said pyroelectric camera.

17. The method of claim 16 wherein said step of grouping said digital output signals includes passing said digital output signals through a pair of gate means to separate said digital output signals into groups, and collecting said digital output signals as grouped utilizing a pair of counter means, and when said step of determining preselected parameters of said groups includes sensing of predetermined set conditions to control generation of said gain signals and comparison of said output signals of said groups to control generation of balance DC restoration signals.

18. The method of claim 17 wherein said sensing of predetermined set conditions is also utilized to control generation of an offset DC restoration signal to further adjust DC restoring levels.

19. The method of claim 18 wherein said grouping of said digital output signals includes grouping said signals into a first group indicative of high level pixels and a second group indicative of low level pixels.

20. The method of claim 19 wherein said first group includes signals indicative of a binary count above 111,0000, and wherein said second group includes signals indicative of a binary count below 000,1111.

* * * * *